Aug. 1, 1967  L. P. SHEPHERD  3,334,303

DELAYED PULSE GENERATING SYSTEM

Filed March 1, 1965  2 Sheets-Sheet 1

United States Patent Office 3,334,303
Patented Aug. 1, 1967

3,334,303
DELAYED PULSE GENERATING SYSTEM
Lloyd P. Shepherd, Huntington Station, N.Y., assignor to Hazeltine Research, Inc., a corporation of Illinois
Filed Mar. 1, 1965, Ser. No. 436,085
4 Claims. (Cl. 328—110)

ABSTRACT OF THE DISCLOSURE

The apparatus includes pulse generating circuits which provide repetitively generated reference and delayed pulses. The reference pulse is compared with an internal trigger pulse generated by the equipment whose response time is to be determined. The delayed pulse is coupled to a sweep circuit which triggers a cathode-ray tube display. The phase between the delayed pulses and the reference pulses is adjusted until output pulses, generated by the equipment in response to the internal trigger pulses, are displayed on the tube. A phase detector is used to detect and compensate for the phase difference between the reference pulse and the equipment's internal trigger pulse to permit measurement of the time interval between the internal trigger pulse and the output pulse, which represents the response time of the equipment.

Figure 1:
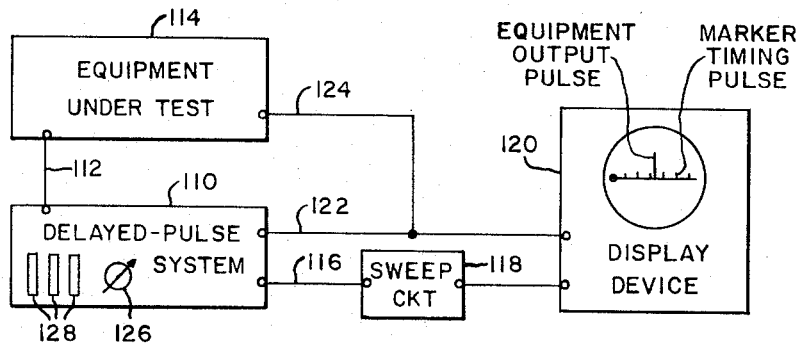

This invention relates to delayed pulse generating systems and, more particularly, to such systems for generating repetitive pairs of reference pulses and delayed pulses. Such systems are particularly useful for measuring the time it takes for equipment under test to develop an output signal in response to some actuating signal. This time, hereinafter referred to as the response time of the equipment under test, is used to provide an indication of the operating performance of the equipment.

Patent No. 2,790,075, issued to R. G. Nelson on Apr. 23, 1957, describes a delayed pulse generating system similar in many respects and purposes to the system sought here to be patented. The system there described, represented as unit 110 in FIG. 1 of applicant's drawings, generates repetitive pulse pairs—the initial pulse of each pair being referred to as a reference pulse and the latter pulse of each pair being referred to as a delayed pulse. As shown in applicant's FIG. 1, the repetitive reference pulses are supplied along a wire 112 to the equipment there under test 114 to actuate it, while the repetitive delayed pulses are supplied along a wire 116 to a sweep circuit 118 to trigger a cathode-ray type display device 120. The output pulse signal developed by the equipment 114 is supplied along a wire 124 to the device 120 where, together with a plurality of marker timing pulses supplied by the system 110 along a wire 122, it is to be displayed thereon. The delay interval between the reference pulse and the delayed pulse of each repetitive pair is then adjusted by a potentiometer control 126 until the equipment output pulse is displayed by the device 120. For this condition, the delay interval—read from a pulse counter 128 and from the marker timing pulse intervals on device 120—is precisely equal to the time between the actuation of the equipment by a reference pulse and the development of an output pulse by the equipment. In other words, for this condition, the delay interval is precisely equal to the response time of the equipment under test.

Such a system works quite well for measuring the operating performance of equipment actuated by an externally applied trigger signal. There are, however, many types of equipment which have internal timing circuits for controlling their own actuation—MTI type radar receivers and video integrators, for example. Such a system as that described in Patent No. 2,790,075 does not work too well with those types of equipment because no relation there exists between the internally triggered equipment output pulse and the internally triggered periodic reference pulse of the pulse generating system. That is to say, the response time of the equipment cannot accurately be found because the measuring system and the system to be measured are each independently triggered. It would be to no avail to know the delay interval between the reference pulse and the delayed pulse of each repetitive pair when the equipment output pulse is displayed for those types of equipment since, for all practical purposes, the reference pulse will always be different from the actuating pulse of the equipment. For this condition, an indication of time delay—measured with respect to a reference pulse—will always be different from an indication of the response time of the equipment—where time is measured with respect to an actuating signal. In other words, for this condition, the system of Patent No. 2,790,075 will not provide a precise indication of the operating performance of the equipment under test.

It is an object of the present invention, therefore, to provide a new and improved delayed pulse generating system for measuring the response time and operating performance of internally actuated electrical equipment.

It is another object of the present invention to provide such a system which resembles very nearly the Patent No. 2,790,075 system so that by making only a few changes to that latter system, a composite delayed pulse generating system could be constructed which would be useful in measuring the response time and operating performance of internally actuated electrical equipment, as well as that of externally actuated electrical equipment.

In accordance with the present invention, apparatus for measuring the response time of internally triggered electrical equipment comprises free-running oscillator means for providing time reference pulses and means for developing pulses having a variable delay relative to the reference pulses and for providing an accurate indication of the duration of that delay. The apparatus also includes means for coupling, from the electrical equipment into the apparatus, trigger pulses of arbitrary phase relative to the reference pulses and, in addition, phase comparison means for comparing the phase of the reference pulses and the trigger pulses for providing an output signal representative of the phase difference between the pulses. The apparatus finally includes means responsive to the output signal for providing an additional delay corresponding to the aforementioned phase difference to the delayed pulses, for causing the indication of delay duration to accurately represent the delay between the trigger pulses and the delayed pulses.

For a better understanding of the present invention together with other and further objects thereof, reference is had to the following description taken in connection with the accompanying drawings, and its scope will be pointed out in the appended claims.

Figure 3:
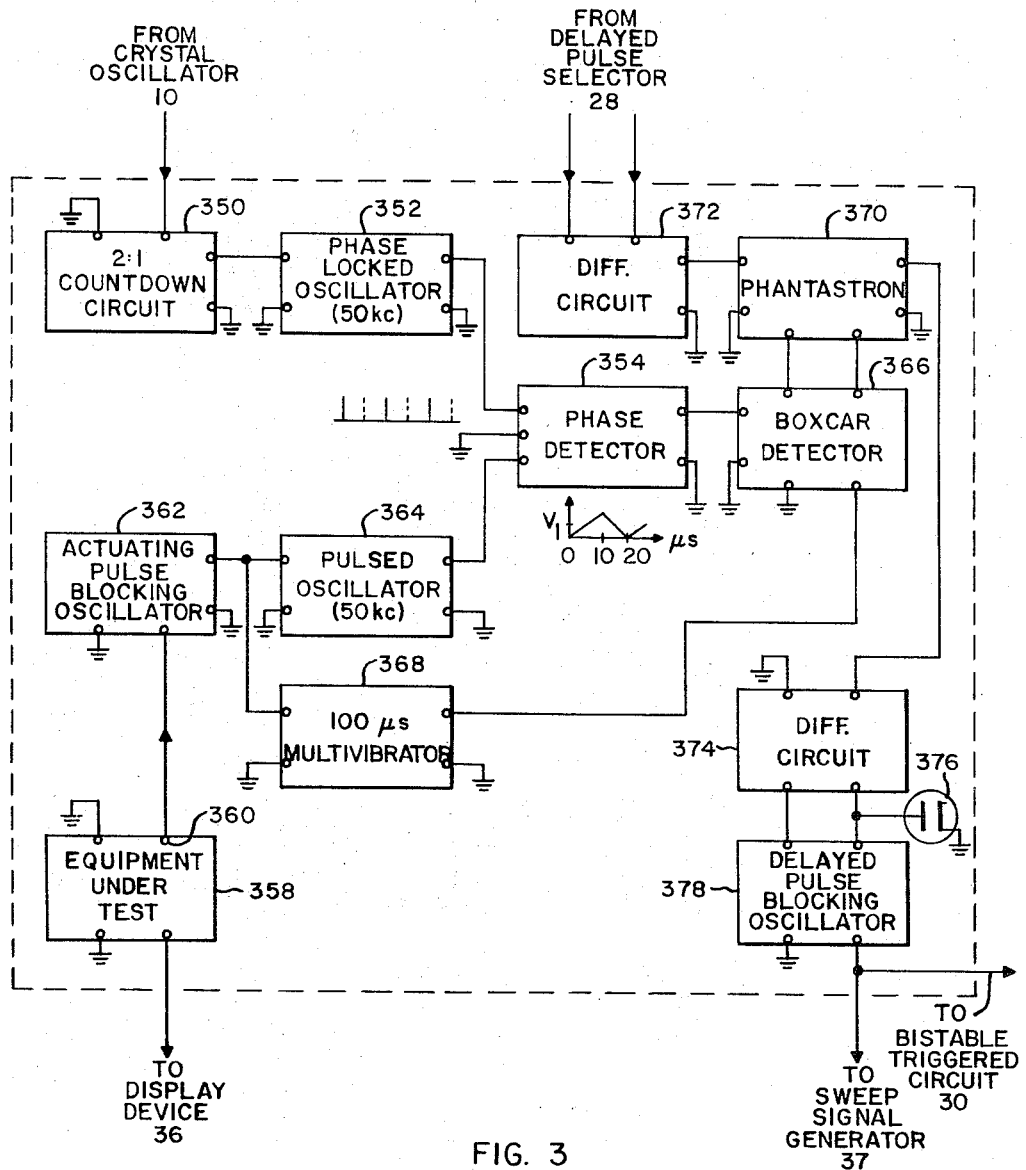
Figure 2:
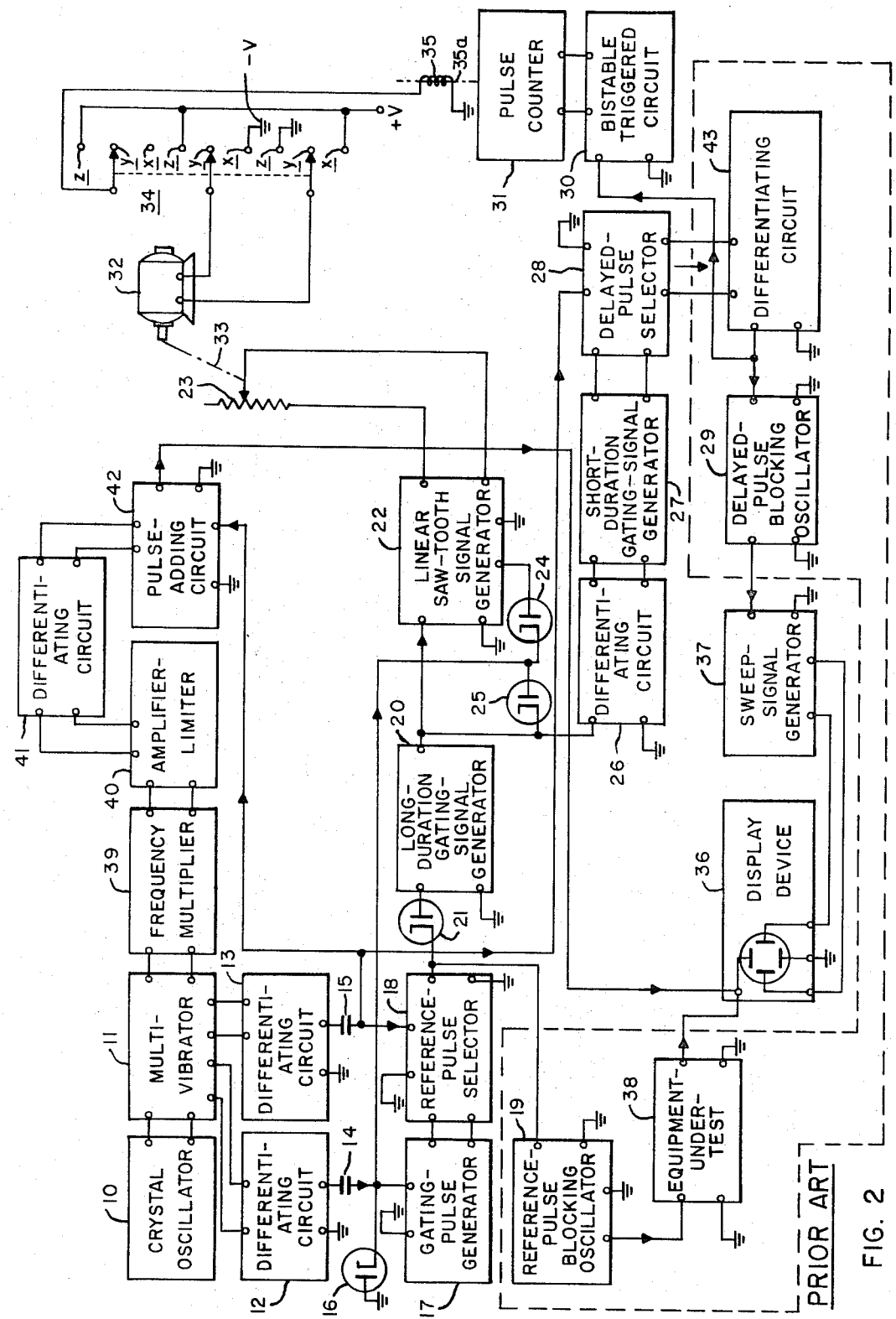

Referring to the drawings:

FIG. 1 is a simple block diagram showing how the delayed pulse generating system of Patent No. 2,790,075 might be used to measure the response time and operating performance of externally actuated electrical equipment;

FIG. 2 is a circuit diagram, partly schematic, of the delayed pulse generating system of Patent No. 2,790,075, with the portion to be modified in accordance with applicant's invention shown within the dotted box, and FIG. 3 is a block diagram of the modifications made to the delayed pulse generating system of Patent No. 2,790,075, in accordance with applicant's invention, and which is to be substituted for the dotted box portion of FIG. 2.

*Description and operation of the delayed pulse generating system of the present invention*

Before considering the description and operation of the delayed pulse generating system constructed in accordance with the present invention, it would be instructive to first consider, in general terms, the procedure by which the response time and operating performance of externally actuated equipment can be determined using the delayed pulse generating system described in Patent No. 2,790,075. That same procedure will be substantially followed to determine the response time and operating performance of internally actuated equipment using the delayed pulse generating system of the present invention.

Thus, there is shown in FIG. 2, one embodiment of the delayed pulse generating system which constitutes the subject matter of Patent No. 2,790,075. That portion of the system shown within the dotted box will be modified as described hereinafter, in accordance with the present invention. As described by that patent, a free-running crystal oscillator 10 supplies a sinusoidal signal having a frequency of 100 kc. That signal is converted by units 11–17 to a train of pulses, one of which is selected by units 18 and 19 to actuate or trigger the equipment under test 38. The one selected reference pulse is also effectively delayed, in ten microsecond steps, for an interval of up to 10,000 microseconds by units 20–29 and 43 and supplied, as such, to unit 37 to trigger the cathode-ray sweep of the display device 36. This device 36 is used to display the output pulse from the equipment 38 and, also, a series of one microsecond spaced marker timing pulses developed from the 100 kc. crystal derived signal by units 11 and 39–42. The delay interval between the reference pulse and the delayed pulse of each repetitive pair is then adjusted, by resistor 23, until the equipment output pulse is displayed by the device 36. When this condition is attained, the unit 31 indicates the number of 10 microsecond pulses occurring between the reference pulse, which triggers the equipment 38, and the delayed pulse, which is effective to trigger the display device 36. The position of the displayed equipment output pulse with respect to the one microsecond marker timing pulses on device 36, provides a further indication of the delay interval between the reference pulse and the delayed pulse of each repetitive pair. The total time delay in microseconds is equal to ten times the number of counts of unit 31 plus the number of marker timing pulse intervals between the start of the cathode-ray sweep and the point on the display at which the equipment output pulse appears. This total time delay then provides a precise indication of the response time and operating performance of the externally actuated equipment 38. Reference should be made to Patent No. 2,790,075 for a more detailed description of the construction and operation of the FIG. 2 system.

As was previously mentioned, such a system and procedure could not be used too effectively to determine the response time and operating performance of internally actuated equipment. This was because no correspondence there existed between the equipment actuating pulse and the reference pulse from which time delay was measured. While such a system could be used to determine the time between the reference pulse and the delayed pulse when the equipment output pulse is displayed, it could not be used to determine the time between the actuating pulse and the output pulse of the equipment under test.

The delayed pulse generating system of the present invention permits accurate determination of such response time and operating performance. As will be more fully described below, this is accomplished by providing a time delay to the repetitive reference pulses in addition to that provided by units 20–29 and 43 of FIG. 2—a delay which compensates for the fact that, for all practical purposes, the internally actuated signal of the equipment under test will not be in time phase with the reference pulses of the system. In this manner, the delayed pulse generating system of the present invention can be used to measure time from an external pulse source which is not in time synchronism with the 100 kc. repetition rate of the system's free-running oscillator.

Referring to FIG. 3, there is shown a portion of the delayed pulse generating system constructed in accordance with the present invention. It is to be understood that the portion shown is to be substituted for the dotted box portion shown in the system of FIG. 2. This FIG. 3 portion, when added to the portion of the FIG. 2 system, not included within the dotted box, will then comprise one embodiment of the present invention. Inputs to, and outputs from, the portion of the system shown in FIG. 3 are with reference to the portion of the FIG. 2 system external to the dotted box there shown.

In FIG. 3, the 100 kc. sinusoidal signal generated by crystal oscillator 10 is counted down to a 50 kc. signal by a 2:1 countdown circuit 350 of conventional construction. The 50 kc. signal so developed is coupled to a phase locked oscillator 352, also of conventional construction, to generate a 50 kc. train of pulses, each pulse of which has a phase that is constant relative to the phase of the 100 kc. crystal derived signal. This 50 kc. train of pulses is then coupled to one input terminal of a conventional phase detector 354. When the timing circuit contained within the equipment under test 358 completes one of its timing cycles, a pulse signal is generated therein to actuate or trigger the equipment once again. This internally generated actuating signal is also available at terminal 360 of the equipment 358 and is coupled to an actuating pulse blocking oscillator 362, of construction similar to that of the reference pulse blocking oscillator 19 of FIG. 2. This oscillator 362 develops a pulse signal of sufficient energy in response to the actuating signal to trigger a normally nonconducting 50 kc. pulse oscillator 364 of any suitable known construction. The 50 kc. train of pulses generated as a result is coupled to a second input terminal of the phase detector 354. Each pulse of this latter 50 kc. train has a phase that is constant relative to the phase of the internally generated actuating signal. However, since for all practical purposes, the internally generated actuating signal will not be in phase with the crystal derived signal, neither will the phase of the 50 kc. train of pulses from oscillator 364 be in phase with the 50 kc. train of pulses from oscillator 352. One example of the phase relationship between the two 50 kc. trains of pulses is shown on the input side of the phase detector 354. The "solid line" pulse train represents that from oscillator 352, while the "dotted line" pulse train represents that from oscillator 364.

Phase detector 354 is selected to have a detection characteristic shown in FIG. 3 as that below the unit 354—phase difference is measured along the abscissa while output voltage is measured along the ordinate. Thus, phase detector 354 develops in response to the two 50 kc. pulse trains an output voltage that is proportional to the phase difference between the two trains of pulses. This voltage, for example $V_1$ on the detection characteristic, is coupled to a boxcar detector 366 of conventional construction, whose memory is controlled by a standard monostable multivibrator 368, of 100 microseconds duration, for example. The pulse signal developed by the actuating pulse blocking oscillator 362 is coupled to the multivibrator 368 to generate a 100 microsecond "gate" signal for controlling the boxcar detector 366. During that 100 microsecond interval, the detector 366 samples and remembers the voltage output of the phase detector 354. When that interval ends, the sampled voltage signal is coupled to a phantastron sweep circuit 370 of conventional construction to vary the bias thereof and, therefore, the duration of the "sweep" and "gate" signals generated thereby. This bias is then maintained constant until the end of the next 100 microsecond gate signal when it is readjusted according to the voltage sampled by the boxcar detector 366 during that next interval. (The duration of this "gate" signal, hence, the choice of the multivibrator to be used, is not critical—it may be of 100 microseconds duration as shown or may be of any length less than the pulse repetition rate of the equipment under test. All that is necessary is that the duration be such as to permit a substantially constant voltage signal to be developed by the detector 366, i.e., that the duration be relatively long compared to the period of the free-running crystal oscillator 10.) Also coupled to the phantastron sweep circuit 370 is the output pulse developed by the differentiating circuit 372 in response to the delayed pulse supplied to it from the delayed pulse selector 28 of FIG. 2. Differentiating circuit 372 may be of construction similar to that of the differentiating circuit 43 of FIG. 2 and supplies an output pulse to trigger the phantastron operation.

The "gate" signal generated by the phantastron sweep circuit 370 is coupled to a conventional differentiating circuit 374 which derives a negative pulse of short duration from the trailing edge thereof. No positive pulse is derived from the leading edge of the "gate" signal due to the clamp diode 376. The short duration negative pulse is then coupled to a delayed pulse blocking oscillator 378, which may be similar in construction to the delayed pulse blocking oscillator 29 of FIG. 2 and which develops in response to the negative pulse a positive pulse of preferred magnitude and duration. This positive pulse is, as indicated, supplied to the bistable triggered circuit 30 of FIG. 2—to control the operation of the counter 31—and also to the sweep signal generator 37—to trigger the cathode-ray sweep of the display device 36.

It will thus be appreciated that, in this manner, any difference in phase existing between the internally generated actuating signal and the crystal derived signal is converted into a voltage which is then used to adjust the duration of the phantastron "gate" signal and, hence, the time delay of the signal used to trigger the cathode-ray sweep and the pulse counting operation. In other words, in this manner, any difference in phase existing between the internally generated actuating signal and the crystal derived signal is converted into a time delay for the reference pulse developed by reference pulse selector 18 of FIG. 2, in addition to that provided by the units 20–28 thereof. Since the reference pulse developed by reference pulse selector 18 of FIG. 2 is in time synchronism with the crystal derived signal (see Patent 2,790,075), the additional time delay provided by the units of FIG. 3 also compensates for the difference in phase between the internally generated actuating signal and the reference pulse which is to be delayed. As a result, any determination of the time interval between the internal actuation of the equipment under test and its developed output pulse using the time delay between the reference pulse and the delayed pulse as a measure, includes a time factor corresponding to any phase difference between the actuating pulse and the reference pulse that might exist. It will be readily apparent, therefore, that by the addition of this delay factor the response time and operating performance of the equipment under test can be measured with respect to the repetitive reference pulse, even though it is not the repetitive reference pulse which triggers the equipment.

In view of the foregoing discussion, it will be obvious to one skilled in the art that a delayed pulse generating system can be quite easily constructed to measure the response time and operating performance of either externally actuated or internally actuated equipment. Because the circuits of the present invention are compatible with the system of Patent No. 2,790,075, all that has to be done to build a composite system is to set up the dotted box portion of FIG. 2, on the one hand, and the FIG. 3 portion, on the other hand, and simply switch operation to one or the other depending on the category into which the equipment under test falls. Since the portion of FIG. 3 includes a number of units which may be identical to units in the FIG. 2 portion—namely, actuating pulse blocking oscillator 362 of FIG. 3 with reference pulse blocking oscillator 19 of FIG. 2, differentiating circuit 372 of FIG. 3 with differentiating circuit 43 of FIG. 2, and delayed pulse blocking oscillator 378 of FIG. 3 with delayed pulse blocking oscillator 29 of FIG. 2—these identical units could be shared by the two arrangements to simplify the composite system all the more. Thus, a composite system could be built using essentially no more than nine additional and conventional units than shown in the system of FIG. 2—viz, units 350, 352, 354, 364, 366, 368, 370, 374 and 376. Such a composite, over-all system provides a very useful test instrument.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for measuring the response time of internally triggered electrical equipment comprising:
   free-running oscillator means for providing time reference pulses;
   means for developing pulses having a variable delay relative to said reference pulses and for providing an accurate indication of the duration of said delay;
   means for coupling, from said electrical equipment into said apparatus, trigger pulses of arbitrary phase relative to said reference pulses;
   phase comparison means for comparing the phase of said reference pulses and said trigger pulses for providing an output signal representative of the phase difference between said pulses;
   and means responsive to said output signal for providing an additional delay directly representative of said phase difference to said delayed pulses, for causing said indication of delay duration to accurately represent the delay between said trigger pulses and said delayed pulses.

2. Apparatus for measuring the response time of internally triggered electrical equipment comprising:
   crystal controlled oscillator means for providing time reference pulses;
   means for developing pulses having a variable delay relative to said reference pulses and for providing an accurate indication of the duration of said delay;
   means for coupling from said electrical equipment into said apparatus, trigger pulses of arbitrary phase relative to said reference pulses;
   phase comparison means including a phase detector coupled to said oscillator means and to said trigger pulse coupling means for comparing the phase of said reference pulses and said trigger pulses for providing a voltage signal representative of the phase difference between said pulses;
   and means including a voltage variable delay circuit coupled to said delay pulse developing means and responsive to said voltage signal for providing an additional delay corresponding to said phase difference to said delayed pulses for causing said indication of delay duration to accurately represent the delay between said trigger pulses and said delayed pulses.

3. Apparatus in accordance with claim 2, in which the phase comparison means also includes a boxcar detector coupled between the phase detector thereof and the voltage variable delay circuit of the additional delay providing means for averaging the phase difference voltage signal provided by said phase detector over a period of time relatively long compared to the period of said crystal controlled oscillator, before application to said voltage variable delay circuit, for insuring that the additional delay provided will be precisely equal to the phase difference between said reference pulses and said trigger pulses.

4. Apparatus in accordance with claim 2 in which the voltage variable delay circuit included within the additional delay providing means includes a phantastron sweep circuit for providing a gate signal whose delay is variable according to the difference voltage indication produced by the phase detector within the phase comparison means.

References Cited

UNITED STATES PATENTS

| 2,701,841 | 2/1955 | Fredrick | 328—110 X |
| 2,790,075 | 4/1957 | Nelson | 328—108 |
| 3,200,340 | 8/1965 | Dunne | 328—134 X |

ARTHUR GAUSS, *Primary Examiner.*

J. HEYMAN, *Assistant Examiner.*